(12) United States Patent
Kanekura

(10) Patent No.: US 6,298,364 B1
(45) Date of Patent: Oct. 2, 2001

(54) DIGITAL SIGNAL PROCESSING OPERATION APPARATUS THAT ALLOWS COMBINED OPERATION

(75) Inventor: Hiroshi Kanekura, Yamatokouriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1199 days.

(21) Appl. No.: 08/526,781

(22) Filed: Sep. 11, 1995

Related U.S. Application Data

(63) Continuation of application No. 08/205,740, filed on Mar. 4, 1994, now abandoned.

(30) Foreign Application Priority Data

Mar. 8, 1993 (JP) .................................................. 5-046342

(51) Int. Cl.[7] .................................................. G06F 7/38
(52) U.S. Cl. .......................................................... 708/490
(58) Field of Search .................. 364/715.01, 715.08, 364/736, 734, 735, 751, 752, 745; 708/490, 524, 521, 550, 551

(56) References Cited

U.S. PATENT DOCUMENTS

| | | | |
|---|---|---|---|
| 5,053,987 | * | 10/1991 | Genusov et al. ...................... 364/736 |
| 5,150,290 | * | 9/1992 | Hunt ..................................... 364/736 |
| 5,212,662 | * | 5/1993 | Cocanougher et al. .............. 364/748 |
| 5,260,897 | * | 11/1993 | Toriumi et al. ....................... 364/736 |
| 5,341,319 | * | 8/1994 | Madden et al. ...................... 364/748 |

FOREIGN PATENT DOCUMENTS

| | | |
|---|---|---|
| 0136834 | 4/1985 | (EP) . |
| 60-54070 | 3/1985 | (JP) . |
| 2-284225-A | 11/1990 | (JP) . |
| 4-15737 U | 2/1992 | (JP) . |
| 4-148231-A | 5/1992 | (JP) . |

OTHER PUBLICATIONS

"Texas Instruments TMS320c30 DSP Preview Bulletin", pp. 1–7, 1988.

"The Exhibition Product Guide Material of Panasonic's 1992 International Industry General Exhibition".

* cited by examiner

*Primary Examiner*—Chuong Dinh Ngo

(57) ABSTRACT

When an instruction code CC that indicates by 1 instruction code a combined operation of an arithmetic operation and a shifting operation is applied to an instruction decoder, the decoder decodes the code CC, and provides an operation control signal S1 and a shift signal S3 to an operation unit and a shifter, respectively. The operation unit carries out an arithmetic operation on input data D1 and D2 according to a signal S1, whereby arithmetic operation resultant data is applied to the shifter via the selector as data having an operation precision greater than that of an eventual combined operation result. The shifter carries out a shifting operation on the input data according to a shift signal S3. Therefore, operation precision is ensured in the combined operation. Furthermore, two instructions of an arithmetic operation instruction and a shifting operation instruction are carried out in 1 instruction execution time, so that high speed operation is allowed.

18 Claims, 4 Drawing Sheets

DIGITAL SIGNAL PROCESSING OPERATION APPARATUS THAT ALLOWS COMBINED OPERATION

This application is a continuation, of application Ser. No. 08/205,740 filed on Mar. 4, 1994, now abandoned.

BACKGROUND OF THE INVENTION

1. Field of the Invention

The present invention relates to operation apparatuses that can be used in general-purpose microcomputers or the like, and more particularly, to improvement of an operation apparatus for digital signal processing.

2. Description of the Background Art

FIG. 1 is a block diagram of an operation apparatus that carries out processing of digital data disclosed in the copending application (U.S. Ser. No. 08/021,963). The copending application is incorporated herein by reference. Referring to FIG. 1, an operation apparatus receives digital data D1 and D2 of n bits, and an instruction code C of m bits respectively as packet data. In response, an operation is carried out to provide data D4 of n bits representing the operation result. The time period starting from entering data into an operation apparatus until the output of data representing an operation result of the input data is referred to as 1 instruction execution period time.

The operation apparatus includes an instruction decoder 21 for decoding an applied instruction code C for providing an operation control signal S5, a selection signal S2, and a rounding/no-rounding signal S4. The operation apparatus further includes a rounding unit 5 for carrying out a rounding process according to rounding/no-rounding signal S4 on input data of 2n bits for providing data D4 of n bits, an operation unit 6 including an adder-subtractor 11 for receiving in parallel data D1 and D2 and carrying out an operation in parallel according to operation control signal S5 to provide a data output, a logical operation unit 12, a multiplier 13 and a shifter 14, and a selector 7 for selecting one of a plurality of input data of 2n bits according to selection signal S2.

Operation control signal S5 includes a signal for switching adder-subtractor 11 to carry out either addition or subtraction, a signal specifying the logical operation contents of logical operation unit 12, or a signal specifying the amount and direction of shifting of shifter 14. Selection signal S2 serves to select and provide one of a plurality of data provided in parallel from operation unit 6 to selector 7. Rounding/no-rounding signal S4 is set to a signal that does not specify a rounding process when input instruction code C is a logical operation instruction code, and is set to a signal for specifying a rounding processing when other instruction codes C are input. The output data of each operation device in operation unit 6 is provided as data of 2n bits when applied to selector 7 from operation unit 6.

When an average of 2 data is to be calculated using the operation apparatus of FIG. 1, first, an add instruction is executed in adder-subtractor 11, whereby the addition resultant data is output from the operation apparatus as data D4. This addition resultant data D4 enters the operation apparatus again, and an instruction of shifting 1-bit rightward (a process of ÷2) is executed in shifter 14 of operation unit 6 to provide data D4. Thus, an average of two data is calculated. This operation process requires at least 2 instruction execution time periods for carrying out an add instruction and a shift instruction. This operation apparatus has a problem that a combined operation of an arithmetic operation and a shifter operation cannot be carried out at high speed.

When 100×¾=75 is to be carried out by 2 instructions using a value converted into a two's complement notation of n=8 bits (value range −128 to 127) in the operation apparatus of FIG. 1:

1) at the first execution, a multiply instruction is carried out, and the result is rounded to 8 bit precision, 100×3= 300—rounded to the maximum value by rounding unit 5→127;

2) a shifting operation is carried out at the next instruction execution,

127÷4 (shifted rightwards by 2 bits) is carried out→31 (greatly differs from the logic value of 75).

When a multiplication+shift operation is carried out by the operation apparatus of FIG. 1, a problem set forth in the following occurs even when the eventual result of the multiplication+shift operation is within the range of the n bit precision. When the n bit precision is exceeded by the multiplication of the above 1), rounding unit 5 is used, and the above-described shift operation of 2) is carried out on an incorrect value rounded to a value that can be represented by n bit precision (a maximum value that can be expressed by n bits or a value having the digits exceeding n bits deleted). Thus, a logically correct operation result, can not be obtained.

A general DSP (Digital Signal Processor) is disclosed in pp. 1–2 in "Texas Instruments TMS320C30 DSP Preview Bulletin" issued by Texas Instruments. A block diagram of a CPU (Central Processing Unit) employed in this DSP is illustrated in page 2 of this literature. Although an ALU (Arithmetic Logical Operation Unit) and a shifter are arranged in series, a multiplier and a shifter are not arranged in series. It is therefore appreciated from the block diagram of this CPU that a combined operation process of multiplication and shifting requires at least 2 instruction execution time periods.

A high speed image processing DSP is disclosed in the Exhibition Product Guide Material of Panasonic's 1992 International Industry General Exhibition. This DSP is characterized in that a control circuit for a DCT (Discrete Cosine Transform) is provided. However, since a block structure is not employed taking into consideration a combined operation of an arithmetic operation and a shift operation, this DSP has disadvantages of requiring 2 instruction execution time periods for such combined operation, and a rounding error of a great level.

In an operation apparatus disclosed in Japanese Patent Laying-Open No. 60-54070, a shifter is employed for carrying out a rounding process when a value overflows in an arithmetic operation. However, there is no disclosure of using this shifter for a combined operation of arithmetic and shifting. Therefore, this operation apparatus has a disadvantage that a combined operation cannot be carried out in 1 instruction execution time period, leading to a problem that the operation speed cannot be increased.

SUMMARY OF THE INVENTION

In view of the foregoing, an object of the present invention is to provide an operation apparatus that carries out a combined operation of an arithmetic operation and a shifting operation at high speed with the operation precision guaranteed.

Another object of the present invention is to provide an operation apparatus that can guarantee maximum operation precision within a logically possible range in a combined operation.

A further object of the present invention is to provide an operation apparatus that can carry out a combined operation at high speed and high precision in a digital image processor.

Still another object of the present invention is to provide an operation apparatus that can process an arithmetic operation and a shifting operation at one pass.

A still further object of the present invention is to provide an operation apparatus that can carry out in high precision approximation calculation of division by a constant value without a divider.

The above objects of the present invention can be accomplished by an operation apparatus including elements set forth in the following. More specifically, an operation apparatus of the present invention can carry out a combined operation instruction from an arithmetic operation instruction and a shift operation instruction using digital data. This apparatus includes an arithmetic operation unit for receiving digital data, carrying out an arithmetic operation thereon according to an arithmetic operation instruction, and providing an operation resultant data in a data length having at least the combined operation precision guaranteed, and a shifting operation unit for receiving operation resultant data provided from the arithmetic operation unit for carrying out a shifting operation thereon according to a shifting operation instruction.

In the operation apparatus of the present invention, an arithmetic operation instruction and a shifting operation instruction are carried out without interruption on digital data input in the operation apparatus. The arithmetic operation resultant data is set to a data length that guarantees the precision of combined operation resultant data of an arithmetic operation and a shifting operation, and a shifting operation is carried out thereon. As a result, a combined operation is effected at high speed with operation precision being highly guaranteed. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings, which are given by way of illustration only and thus are not limitative of the present invention, and wherein.

DESCRIPTION OF THE PREFERRED EMBODIMENTS

Figure 2:
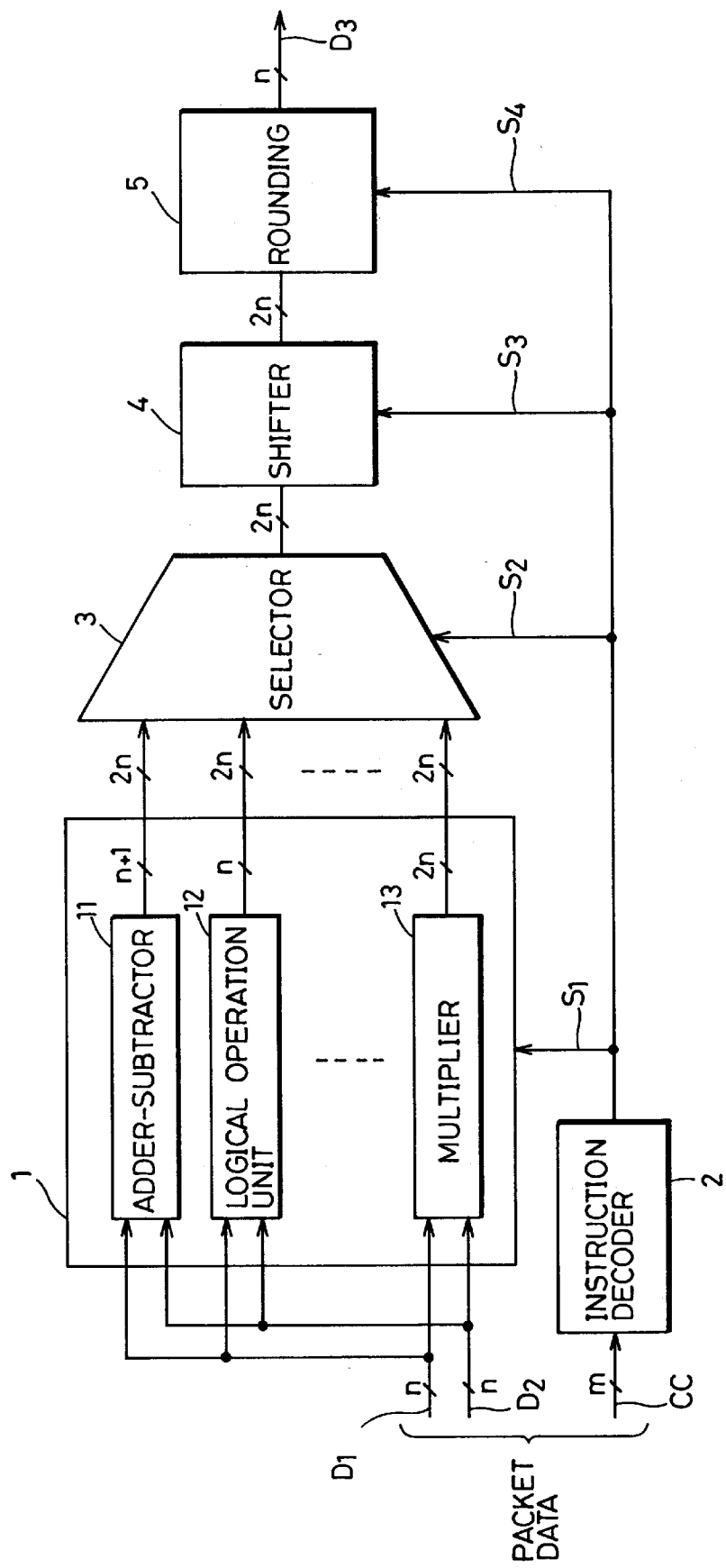
FIG. 2 is a block diagram of an operation apparatus for processing digital data according to an embodiment of the present invention.

Referring to FIG. 2, an operation apparatus receives digital data D1 and D2 of n bits and an instruction code CC of m bits respectively as packet data. In response, an operation is carried out to provide data D3 of n bits representing the operation results. Instruction code CC includes a combined operation instruction code of an arithmetic and a shifting operation instruction. The operation apparatus of FIG. 2 includes an operation unit 1 including an adder-subtractor 11, a logical operation unit 12 and a multiplier 13, an instruction decoder 2, a selector 3, a shifter 4, and a rounding unit 5. Instruction decoder 2 decodes instruction code CC to provide an operation control signal S1, a selection signal S2, a shift signal S3, and a rounding/no-rounding signal S4 to operation unit 1, selector 3, shifter 4, and rounding unit 5, respectively. Operation control signal S1 includes a signal for switching adder-subtractor 11 to carry out either an addition or a substraction process, a signal for specifying a multiplication operation of multiplier 13 or a signal for specifying the logical operation contents of logical operation unit 12. Selection signal S2 serves to input and output one of a plurality of data of 2n bits provided in parallel to selector 3 from operation unit 1. Shift signal S3 specifies the amount and direction of shifting of shifter 4. Rounding/no-rounding signal S4 is set to a signal that does not specify a rounding process when input instruction code CC is a logical operation instruction code, and to a signal that specifies a rounding process when input instruction code CC is other instruction codes CC.

Figure 1:
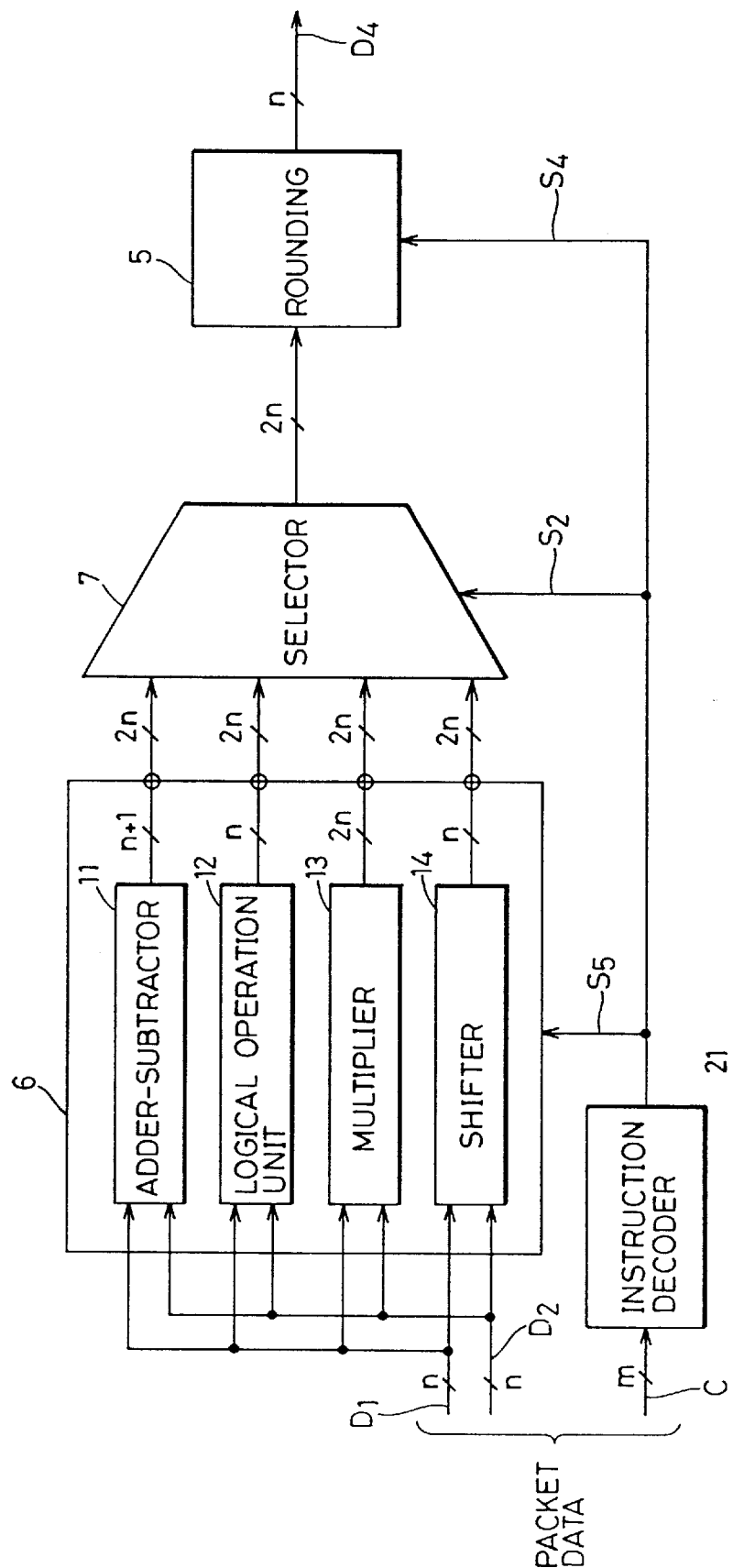
FIG. 1 is a block diagram of an operation apparatus for processing digital data.

The operation apparatus of FIG. 2 differs from the operation apparatus of FIG. 1 in that shifter 14 in operation unit 6 of FIG. 1 is provided as a shifter 4 between selector 3 and rounding unit 5 as shown in FIG. 2. Shifter 4 receives from selector 3 data of 2n bits, and applies a shifting process according to shift signal S3. The data is set as a 2n-bit data to be provided to rounding unit 5. The bit width of shifter 14 in FIG. 1 is different from that of shifter 4 in FIG. 2. A decode circuit for the combined instruction is added in instruction decoder 2 in FIG. 2 compared with instruction decoder 21. The other corresponding components of FIG. 2 are similar to those shown in FIG. 1, and their detailed description will not be repeated.

The operation apparatus of FIG. 2 is characterized as follows.

(1) A shifter 4 that operates in response to receiving an operation result of operation unit 1 is disposed at the output stage of operation unit 1.

(2) A control facility is provided for executing an instruction of carrying out an arithmetic operation in operation unit 1 and a shifting operation in shifter 4 when an instruction code CC specifying a combined operation of an arithmetic operation and a shifting operation is applied as well as execution of only a general arithmetic operation or only a shifting operation.

(3) By increasing the bit width (2n bit width) of intermediate data transferred from operation unit 1 to shifter 4 in a combined operation, a maximum operation precision is ensured within a logically possible range.

A combined operation executed in the operation apparatus of FIG. 2 includes addition and shifting operation, subtraction and shifting operation, multiplication and shifting operation, or the like. When instruction code CC is an arithmetic operation instruction code or a logical operation instruction code, instruction decoder 2 will not provide shift signal S3. Therefore, the arithmetic operation resultant data or logical operation resultant data provided from operation unit 1 via selector 3 passes through shifter 4 into rounding unit 5.

When instruction code CC is a shifting operation instruction code, operation unit 1 responds to operation control signal S1 to pass input data with no operation carried out thereon. Selector 3 responds to selection signal S2 to select input data from adder-subtractor 11 to provide the same to shifter 4.

The operation of an operation apparatus according to a combined operation instruction code CC of an arithmetic operation and a shifting operation will be described hereinafter.

Data D1 and D2 of n bits are provided to operation unit 1, and a combined operation instruction code CC of m bits is applied to instruction decoder 2. Decoder 2 decodes the applied instruction code CC to provide operation control signal S1, selection signal S2, shift signal S3 and rounding/no-rounding signal S4 to operation unit 1, selector 3, shifter 4, and rounding unit 5, respectively. Input data D1 and D2 are applied to operation unit 1, whereby a process of addition, subtraction or multiplication is carried out according to operation control signal S1. Logically, a result of an addition-subtraction process of n bits requires an n+1 bit precision, and a result of a multiplication process of data of n bits requires a 2n bit precision. Output data from each operation device of operation unit 1 are all converted into data of 2n bits and applied to selector 3 in parallel. Selector 3 responds to selection signal S2 to select one of a plurality of input data, and provides the same directly to shifter 4.

Regarding the output of each operation device of operation unit 1, adder-subtractor 11 outputs data of n+1 bits, and multiplier 13 outputs data of 2n bits. In order to have the bit width of data output from adder-subtractor 11 coincide with that of data output from multiplier 13 having the greatest bit width, output of adder-subtractor 11 is changed to be data of 2n bits by adding n−1 times of the value of the most significant bit of the output of adder-subtractor 11 to the upper bit side of the most significant bit. (This operation will not change the value of resultant data of adder-subtractor 11.) In the operation apparatus of FIG. 2, it is necessary and sufficient that the bit width of data entered into selector 3 has a bit width of 2n bits. A greater bit width is not necessary since precision of a higher level (greater bit width) will not contribute to improve the precision of the eventual operation result at all.

The 2n-bit data selected by selector 3 according to selection signal S2 is applied to shifter 4. A shifting process of a predetermined number of bits is applied in a shifting direction according to shift signal S3. This shifting result data is applied to rounding unit 5 as data of 2n bits. When the shifted resultant data takes a value exceeding the n bits precision, it is rounded to a maximum number that can be expressed by n bits to be provided as data D3 of n bits.

By applying the operation apparatus of FIG. 2 to a digital image processor or the like, a combined operation processing of an arithmetic operation and a shifting operation which is a process that frequently occurs in the processor to obtain an average of pixels can be carried out at high speed and high precision. Furthermore, approximation calculation of division by a constant number can be carried out at high precision without a divider. This will be described in detail hereinafter.

Figure 3:
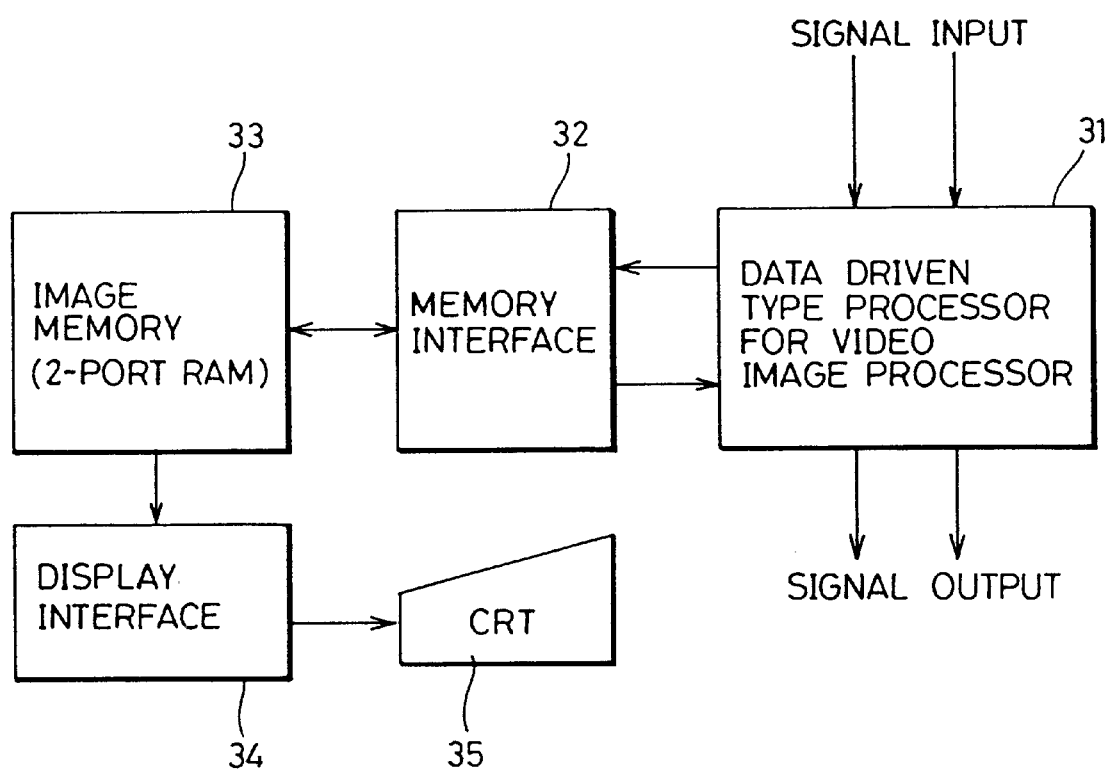
FIGS. 3 and 4 are block diagrams showing the image processing apparatus.
Figure 4:
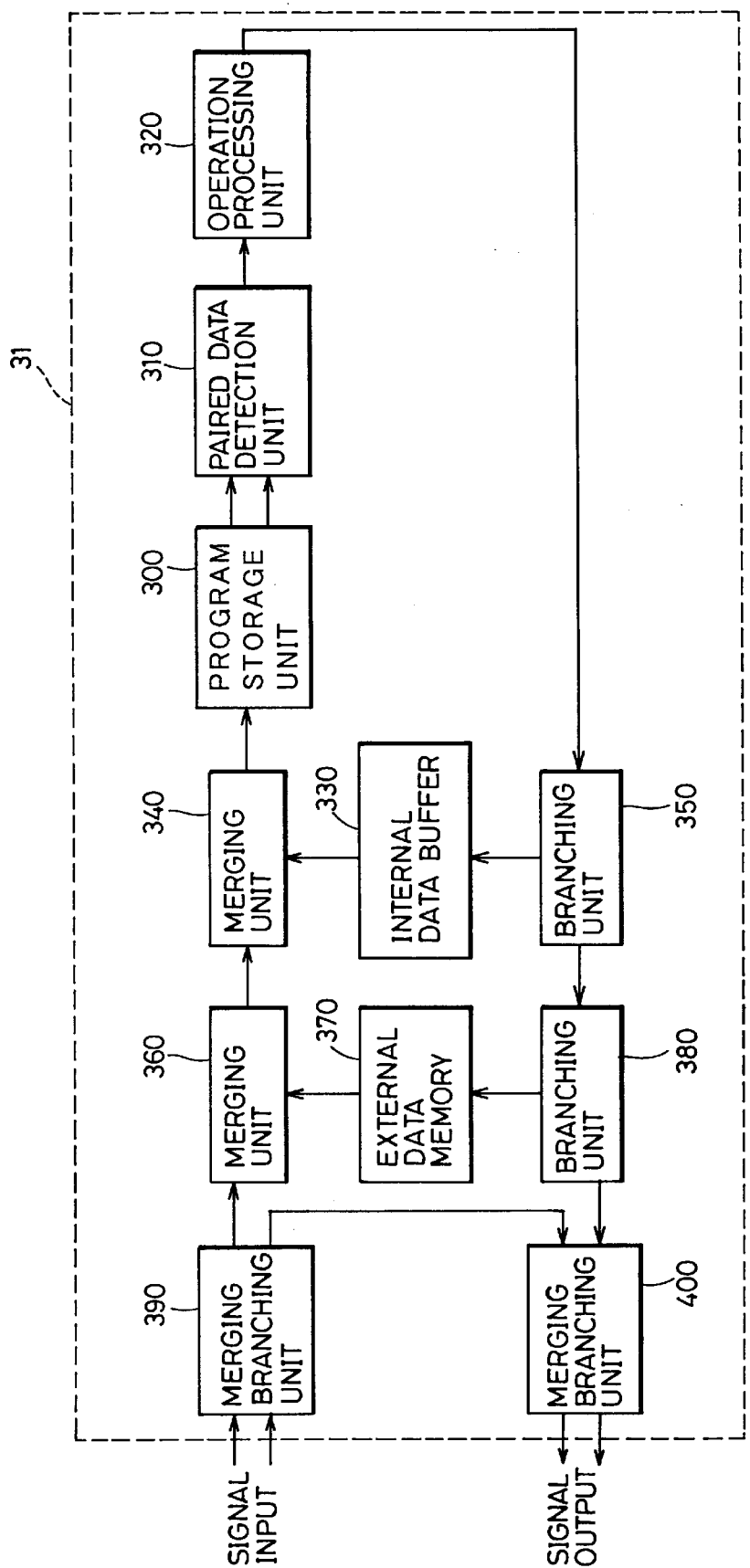

FIG. 3 is a block diagram showing the image processing apparatus and FIG. 4 is a functional block diagram showing the contents of a data driven type processor for a video image processor. Referring to FIG. 3, the image processing apparatus includes a data driven type processor 31 for image processing, a memory interface 32, an image memory 33, a display interface 34 and a graphic display 35. Referring to FIG. 4, a data driven type processor 31 using the operation processing apparatus of the present embodiment includes merging/branching units 390 and 400, merging units 340 and 360, branching units 350 and 380, an external data memory 370, an internal data buffer 330, a program storage unit 300, a paired data detection unit 310, and an operation processing unit 320. External data memory 370 corresponds to memory interface 32 and image memory 33 of FIG. 3. The operating apparatus of the present invention shown in FIG. 2 serves as operation processing unit 320 in FIG. 4.

In executing 100×¾=75 with a combined operation instruction according to a two's complement notation of n=8 bits (value range−128 to 127) by the operation apparatus of FIG. 2:

(1) multiplication is carried out using multiplier 13,

100×3=300 (because the output of multiplier 13 has a precision of 2n=16 bits, the multiplication resultant data is not rounded);

(2) shifter 4 carries out a shifting operation on data output from multiplier 13 via selector 3, 300÷4=75 (the correct answer is obtained). Because the shifting operation resultant data is within the range of the precision of 8 bits, a rounding operation is not carried out in rounding unit 5).

Thus, a combined operation which conventionally required 2 instruction execution time periods can be carried out in 1 instruction execution time periods, and the operation speed and operation precision are improved in the operation apparatus of FIG. 2.

In obtaining data of ⅓ times a pixel data (value 115) which frequently occurs in a digital image processing (the result is an integer):

Example: 115×⅓=38.33 . . . (logic value)

[Conventional Case] 115×⅓≈115×½²=28 (error from logic value 10.33 . . . ).

In the notation of a complement on two of 8 bits, an error according to a rounding process by rounding unit 5 occurs due to overflow of a multiplication process by multiplier 13 in operation unit 6 if the numerator of the fraction multiplied by value 115 is 2 or above. Therefore, the numerator of the fraction multiplied by value 115 can take only the value of 1. Among fractions having a numerator of 1 and a denominator which is a power of 2, a fraction $½^2$ which mostly approximates ⅓ is multiplied by 115. Multiplication of this fraction (a decimal) is realized by multiplying 115 by 1 in multiplier 13 of operation unit 6, and by shifting multiplication resultant value rightwards by 2 bits arithmetically in shifter 14 of operation unit 6 (FIG. 1).

When the above-described multiplication process of 115×⅓ is carried out by the operation apparatus of FIG. 2, the resultant value is:

$$115 \times ⅓ \approx 115 \times 43/2^{7-38} \text{ (error from logic value 0.33 . . . )}$$

It is appreciated that the operation precision is significantly increased in comparison with that of a conventional case. This will be described hereinafter.

Because the operation resultant data of operation unit 1 will not overflow as shown in FIG. 2, the numerator of the fraction approximating ⅓ (which is to be multiplied by value 115) may take any value as long as the product with 115 does not exceed the output bit width (16 bits) precision of multiplier 13. For example, when the numerator is 43, a value of $43/2^7$ having a denominator of a power of 2 and approximately ⅓ is multiplied by value 115. Therefore, a multiplication of 115×43 is first carried out in multiplier 13 of operation unit 1. The resultant data is applied to shifter 4 via selector 3. In response to the data input, shifter 4 carries out a shift rightwards by 7 bits arithmetically for the input data. Thus, the operation apparatus of FIG. 2 is an integer operation apparatus that provides a sufficient high precision of operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An operation apparatus for carrying out an instruction specifying a combined operation of an arithmetic operation and a shifting operation using digital data of n bit length, comprising:

instruction decoding means for decoding the instruction into an arithmetic instruction indicative of the arithmetic operation of the instruction and a shifting instruction indicative of the shifting operation of the instruction;

arithmetic operation means, coupled to said instruction decoder means, for receiving said digital data, carrying out one of a plurality of arithmetic and logical operations according to the arithmetic instruction in response to said digital data, and providing an operation resultant data of 2n bit length over one of a plurality of outputs in which at least precision of said combined operation is guaranteed;

selection means, coupled to said arithmetic operation means, for selecting the one of the plurality of outputs on which said operation resultant data is provided in accordance with a selection signal provided by said instruction decoding means;

shifting operation means having 2n bit width capacity, operatively coupled to said selection means to receive said selected operation resultant data, for carrying out a shifting operation in response to said selected operation resultant data according to the shifting instruction; and rounding processing means, coupled to receive an output value of said shifting operation means, for rounding the output value of said shifting operation means to n-bit length in accordance with a rounding instruction provided by said instruction decoding means, said rounding processing means not rounding the output value of said shifting operation means when the arithmetic instruction is indicative of a logical operation and rounding the output value of said shifting operation means when the arithmetic instruction is indicative of an arithmetic operation, said combined operation specified by the instruction being performed during a single instruction execution period.

2. The operation apparatus according to claim 1, wherein said arithmetic operation means comprises a plurality of operation devices for each performing respective different arithmetic and logical operations on said digital data.

3. The operation apparatus according to claim 2, wherein said plurality of operation devices comprise an adder/subtractor and a logical operational unit, the arithmetic instruction designating one of said adder/subtractor and said logical operation unit for an addition, subtraction or logical operation, respectively.

4. The operation apparatus according to claim 1, wherein said selection means selects and outputs said operation resultant data to said shifting operation means in parallel in accordance with the selection signal.

5. The operation apparatus according to claim 1, wherein said shifting operation means carries out a shifting operation of specified direction and bit shift in accordance with the shifting instruction.

6. An apparatus for processing a plurality of input digital image data of n bit length in accordance with an instruction specifying a combined operation of an arithmetic operation and a shifting operation, comprising:

instruction means for decoding the instruction to provide an arithmetic instruction indicative of the arithmetic operation of the instruction and a shifting instruction indicative of the shifting operation of the instruction which instruct the apparatus to process the instruction in a single pass through the apparatus;

arithmetic means, coupled to said instruction means, for carrying out one of a plurality of arithmetic and logical operations on said plurality of input digital image data according to the arithmetic instruction to provide operation resultant data of 2n bit length over one of a plurality of outputs;

selection means, coupled to said arithmetic means, for selecting the one of the plurality of outputs on which the operation resultant data is provided in accordance with a selection signal provided by said instruction means;

shifting operation means, having 2n bit width capacity and being operatively coupled to said selection means, for carrying out a shifting operation in accordance with the shifting instruction by shifting the selected operation resultant data; and rounding processing means, coupled to said shifting operation means, for rounding an output of said shifting operation means to n-bit length in accordance with a rounding signal provided by said instruction means, said rounding processing means not rounding the output of said shifting operation means when the arithmetic instruction is indicative of a logical operation and rounding the output of said shifting operation means when the arithmetic instruction is indicative of an arithmetic operation.

7. The apparatus according to claim 6, wherein said plurality of operation devices comprise an adder/subtractor and a logical operational unit, the arithmetic instruction designating one of said adder/subtractor and said logical operation unit for an addition, subtraction or logical operation, respectively.

8. The apparatus according to claim 6, wherein said selection means selects and outputs the operation resultant data to said shifting operation means in parallel in accordance with the selection signal.

9. The apparatus according to claim 6, wherein said shifting operation means carries out a shifting operation of specified direction and bit shift in accordance with the shifting instruction.

10. An apparatus for performing a combined processing operation on a received data packet which includes digital data and instruction data, comprising:

an instruction decoder for decoding the instruction data of the received data packet to output an arithmetic instruction and a shift instruction;

an arithmetic operator, coupled to said instruction decoder, for performing one of a plurality of arithmetic and logical operations on the digital data of the received data packet in accordance with the arithmetic instruction and for providing a resultant data;

a shifter, coupled to said arithmetic operator, for shifting the resultant data in accordance with the shift instruction to produce shift data; and a rounding unit, coupled to said shifter, for rounding the shift data when said arithmetic operator provides resultant data based on an arithmetic operation and for not rounding the shift data when said arithmetic operator provides resultant data based on a logical operation.

11. The apparatus of claim 10, wherein the digital data has n bit length, the resultant data has 2n bit length and said shifter has 2n bit capacity.

12. The apparatus of claim 11, wherein said rounding unit rounds the shift data to n-bit length.

13. The apparatus of claim 10, wherein the combined processing operation for producing the shift data from the received data packet in accordance with the instruction data is performed during a single instruction execution time period.

14. A method of performing a combined processing operation on a received data packet which includes digital data and instruction data comprising the steps of:
 a) decoding the instruction data of the received data packet to provide an arithmetic instruction and a shift instruction;
 b) performing one of a plurality of arithmetic and logical operations on the digital data of the received data packet in accordance with the arithmetic instruction to provide a resultant data;
 c) shifting the resultant data in accordance with the shift instruction to provide shift data; and
 d) rounding the shift data when the resultant data is provided based on an arithmetic operation and not rounding the shift data when the resultant data is provided based on a logical operation.

15. The method of performing a combined processing operation of claim 14, wherein the digital data has n bit length, the resultant data has 2n bit length and said step c) of shifting has 2n bit capacity.

16. The method of performing a combined processing operation of claim 15, wherein said step d) of rounding comprises rounding the shift data to n-bit length.

17. The method of performing a combined processing operation of claim 14, wherein the combined processing operation for producing the shift data from the received data packet in accordance with the instruction data is performed during a single instruction execution time period.

18. The apparatus of claim 6, wherein said arithmetic means comprises a plurality of operation devices for each performing respective different arithmetic and logical operations on said plurality of input digital image data.

* * * * *